US006220027B1

(12) United States Patent
Heusser

(10) Patent No.: US 6,220,027 B1
(45) Date of Patent: Apr. 24, 2001

(54) STACKER CONTROL

(75) Inventor: Martin Heusser, Munich (DE)

(73) Assignee: Heilmeier & Weinlein Fabrik fur Oel-Hydraulik GmbH & Co., KG (DE)

( * ) Notice: Subject to any disclaimer, the term of this patent is extended or adjusted under 35 U.S.C. 154(b) by 0 days.

(21) Appl. No.: 09/226,757

(22) Filed: Jan. 6, 1999

(30) Foreign Application Priority Data

Feb. 13, 1998 (DE) .......................................... 298 02 498 U

(51) Int. Cl.[7] ............................. F16D 31/02; F15B 11/08

(52) U.S. Cl. ................................................ 60/422; 91/446

(58) Field of Search ................................ 60/422; 91/420, 91/445, 446; 414/665, 669, 672

(56) References Cited

U.S. PATENT DOCUMENTS

| | | | | |
|---|---|---|---|---|
| 3,568,868 | * | 3/1971 | Chichester | 60/422 X |
| 3,701,446 | * | 10/1972 | Smith, Jr. | 414/670 |
| 3,722,723 | * | 3/1973 | Matthews | 414/636 |
| 3,850,322 | * | 11/1974 | Miles et al. | 414/607 |
| 3,875,747 | * | 4/1975 | Briggs | 60/420 |
| 3,998,345 | * | 12/1976 | Fiehler et al. | 414/641 |
| 4,023,646 | * | 5/1977 | Heisig et al. | 60/422 X |
| 4,144,946 | * | 3/1979 | Melocik | 60/422 X |
| 4,336,687 | * | 6/1982 | Morgan | 60/422 X |
| 4,343,151 | * | 8/1982 | Lorimor | 60/422 |
| 4,361,075 | * | 11/1982 | Block | 91/420 |
| 4,485,623 | * | 12/1984 | Chichester et al. | 60/422 |
| 4,635,439 | * | 1/1987 | Wible | 60/422 X |
| 4,663,936 | * | 5/1987 | Morgan | 60/422 |
| 4,665,695 | * | 5/1987 | Rau et al. | 60/422 X |
| 4,972,761 | * | 11/1990 | Thomsen | 91/445 X |
| 5,215,158 | * | 6/1993 | Pedersen | 60/422 X |
| 5,259,293 | * | 11/1993 | Brunner | 91/420 |
| 5,653,569 | * | 8/1997 | Sears | 414/607 |

* cited by examiner

*Primary Examiner*—John E. Ryznic
(74) *Attorney, Agent, or Firm*—Cook, Alex, McFarron, Manzo, Cummings & Mehler, Ltd.

(57) ABSTRACT

In a stacker control of a stacker (fork lift) for high storage racks comprising a swing-shift fork (G) which is pivotable about a vertical axis (7) and horizontally movable in computer-assisted fashion by hydraulically controlled hydraulic motors (H1, H2) via a directional control valve (W1, W2) which is connected to a joint source of pressure (15, P), a three-way pressure balance (D) is provided between the source of pressure (15) and the directional control valves (W1, W2) for giving priority to one of said hydraulic motors (H1, H2). the three-way pressure balance (D) being controlled by control pressures tapped upstream and downstream of the directional control valve, at least the directional control valve of the preferential hydraulic motor having an open zero position, and the three-way pressure balance (D) forming part of a neutral circulation circuit (U) led via the control piping of the further hydraulic motor from the source of pressure to tank.

8 Claims, 3 Drawing Sheets

FIG. 1
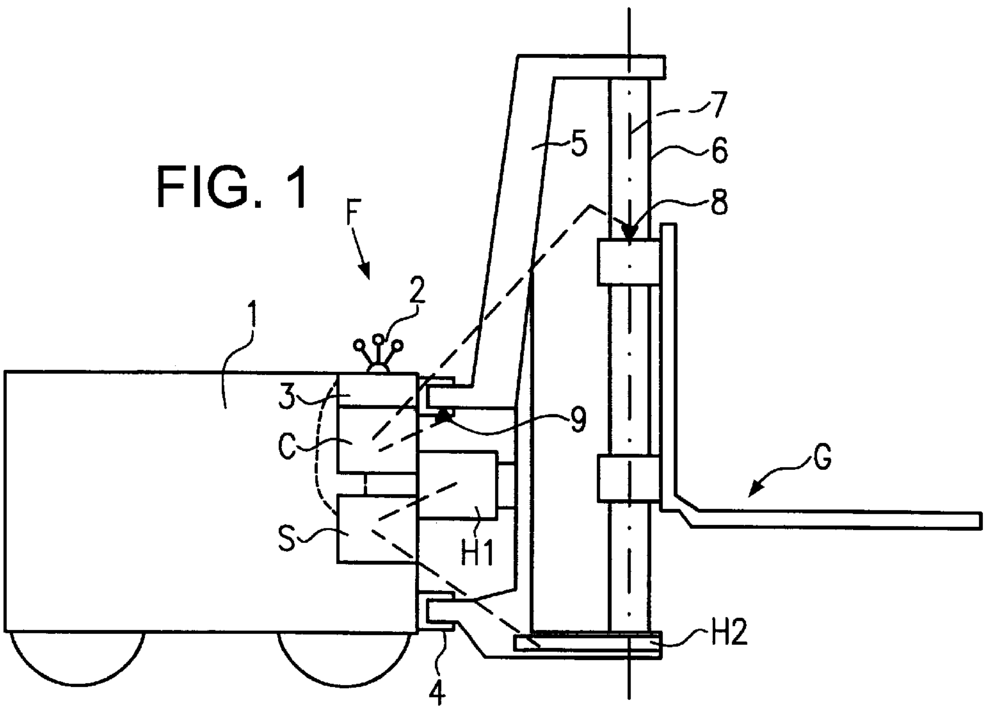
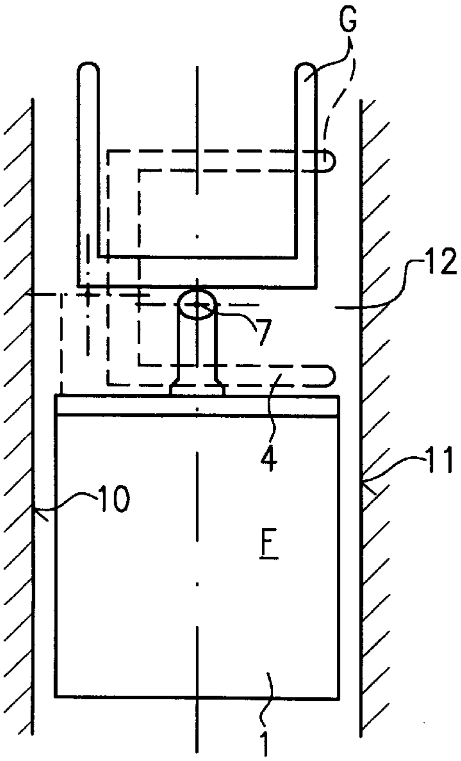
FIG. 2
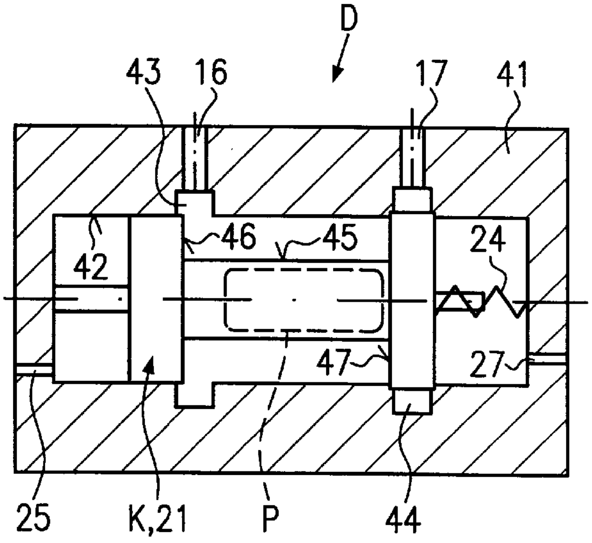
FIG. 5

STACKER CONTROL

BACKGROUND OF THE INVENTION

The present invention relates to a stacker control.

Shelf stackers (special sorts of fork lift trucks, the fork of which can be lifted and lowered vertically but also have additional fork functions such as additional lift, thrust, turning the fork), in particular stackers for high storage racks, comprising swing-shift forks require a high degree of safety during control of the fork if they operate within a laterally defined aisle area, e.g. between rows of shelves. For reasons of space the aisle area is often so limited that uncontrolled turn and thrust movements of the fork may easily lead to collisions. Therefore, for such complicated maneuvering operations, shelf stackers are often operable by means of a computer which guides the stacker control by simultaneously swinging and shifting the fork, so that the fork does not collide with the rows of shelves. To this end, the computer must not only be informed in a precise manner about the actual position of the fork, but the stacker control must be precisely guidable by the computer, i.e. exactly in proportion with the control signals. A further problem encountered in the case of a precise proportional control of the swing-shift fork arises from the fact that hydraulic motors which carry out swinging and shifting operations, respectively, optionally at the same time, require clearly distinct flow rates, e.g. in a ratio of 1:3 to 1:6, and the control of the hyraulic motor with the smaller rate must also be reliably proportional in cases where the hydraulic motor requiring the larger amount is moved at the same time.

It is known in practice that in the stacker control of a shelf stacker a three-way flow regulator (3-way control valve) and a proportional directional control valve with upstream supply regulator are assigned to each hydraulic motor to achieve precise proportionality during control, as is e.g. required for maneuvering operations within narrow aisle areas. Such a stacker control is not only very troublesome and expensive, but requires a lot of space, which is not readily available in the case of shelf stackers, because of the complicated hydraulic components. Therefore, such a stacker control is also very troublesome for the reason that a specific neutral circulation switching function of the hydraulic medium, which is delivered by the source of pressure, is required, for instance in case of pilot pressure tapping (PSL load sensing principle), in the directional control valves.

Furthermore, it is known in practice that the stacker control of such shelf stackers is equipped with a plurality of pressure balances, directional control valves and lowering brake valves (drop-rate braking valves) to save space and costs. However, it is thereby not possible to achieve a sufficiently proportional control, as is e.g. needed for maneuvering operations within limited aisle areas. Such shelf stackers first must move out of the aisle area for the swing-shift adjustment of the fork, and must again move into the aisle with the adjusted fork, or the aisle areas between rows of shelves must be made correspondingly wide in relation with the width of the fork.

In control devices which are known from WO86/06142, U.S. Pat. No. 3,911,942, U.S. Pat. No. 3,987,623 and DE-A-1 95 49 150, control priority is given to a selected group of consumers over other consumers. The control devices contain three-way pressure balances or multi-way valves which serve flow control purposes.

Further prior art is found in U.S. Pat. No. 4,517,800, U.S. Pat. No. 4,733,533, DE-A-301 61 57 and U.S. Pat. No. 4,543,031.

SUMMARY OF THE INVENTION

It is the object of the present invention to provide a stacker control of the aforementioned type which is inexpensive, space-saving and comfortable and which permits a safe maneuvering of the swing-shift fork within narrow aisle areas, possibly in computer-assisted fashion.

This object is achieved with the following features of claim 1.

With the help of the three-way pressure balance, priority is always given in a constructionally simple and inexpensive manner to the hydraulic motor in which under simultaneous control of a further hydraulic motor the risk of a no longer exactly proportional control is given, i.e. normally to the hydraulic motor having the lower flow rate. In a shelf stacker or stacker for high storage racks, this is normally the hydraulic motor which is in charge to turn the fork about the vertical axis. Thanks to the action of the three-way pressure balance, the further hydraulic motor(s) only receive(s) the excess amount so that at least the preferential hydraulic motor can be controlled in a precisely proportional manner under all operating conditions. The installation space for the stacker control and also the equipment efforts are reduced because a few compact components are sufficient and because the three-way pressure balance permits a very simple neutral circulation switching through which the hydraulic medium delivered by the source of pressure, which is normally operated electrically, passes at a small throttling resistance and small counterpressure into the return means. The proportional directional control valve of the preferred hydraulic motor relieves the two work lines to the return means in its zero position so that a strong control pressure drop which can be used for the neutral circulation switching is given. The further hydraulic motor is also controllable in a precisely proportional manner via the three-way flow regulator, with a three-way flow regulator, the three-way pressure balance and the further directional control valves cooperating for the establishment of the neutral circulation circuit.

According to another feature of the invention the swing-type hydraulic motor for the fork turn function is the preferential hydraulic motor which requires a smaller flow rate than the further hydraulic motors and in which a precise proportional control is important for difficult maneuvers of the swing-shift fork.

According to another feature the precise proportional control is possible with the help of the proportional directional control valve which simultaneously contains the regulating aperture for the three-way pressure balance.

According to another feature there is provided a simple load holding device for hydraulically blocking each hydraulic motor and for holding a load without any leakage. The load holding device with the load holding valves which can alternately be pilot-operated from the work lines permits a sensitive motional control under load and helps, above all, to simplify the neutral circulation switching because in a load holding situation both work lines are relieved downstream of the directional control valve, and a pilot pressure for the three-way pressure balance is automatically present which switches the three-way pressure balance into the neutral circulation position. Furthermore, the load holding device permits the use of a short directional control valve which is open in the zero position and which, therefore, does not require separate flow paths for the neutral circulation.

According to another feature the pilot pressure for the three-way pressure balance and the neutral circulation switching is tapped in a constructionally simple manner without the directional control valve, which is thus compact, requiring any troublesome constructional measures.

According to another feature, the three-way pressure balance gives supply priority to the selected hydraulic motor over the further hydraulic motor(s) irrespective of whether and how said motors are acted upon.

According to another feature, the three-way pressure balance is of a particularly simple construction.

According to another feature, if no further hydraulic motor is acted upon, the pressurized fluid delivered by the source of pressure is guided in the neutral circulation circuit with the throttling loss into the return means via the directional control valve of the further hydraulic motor or said directional control valve and the three-way flow regulator arranged upstream of said valve.

According to another feature the further hydraulic motor is controlled either only in its direction at a speed depending on the amount left by the preferential hydraulic motor, or optionally via a delivery control of the source of pressure (speed-controlled pump).

According to another feature the swing-shift fork can be guided by the computer when complicated movement maneuvers are to be controlled, with the displacement and/or position detectors providing the actual parameters for the computer.

Embodiments of the subject matter of the invention will now be explained with reference to the drawing, in which:

BRIEF DESCRIPTION OF THE DRAWINGS

FIG. 1 is a schematic side view of a shelf stacker;

FIG. 2 is a schematic top view on a shelf stacker during work within a restricted aisle area.

FIG. 5 is a schematic longitudinal section through a detail.

DESCRIPTION OF THE PREFERRED EMBODIMENTS

Figure 3:
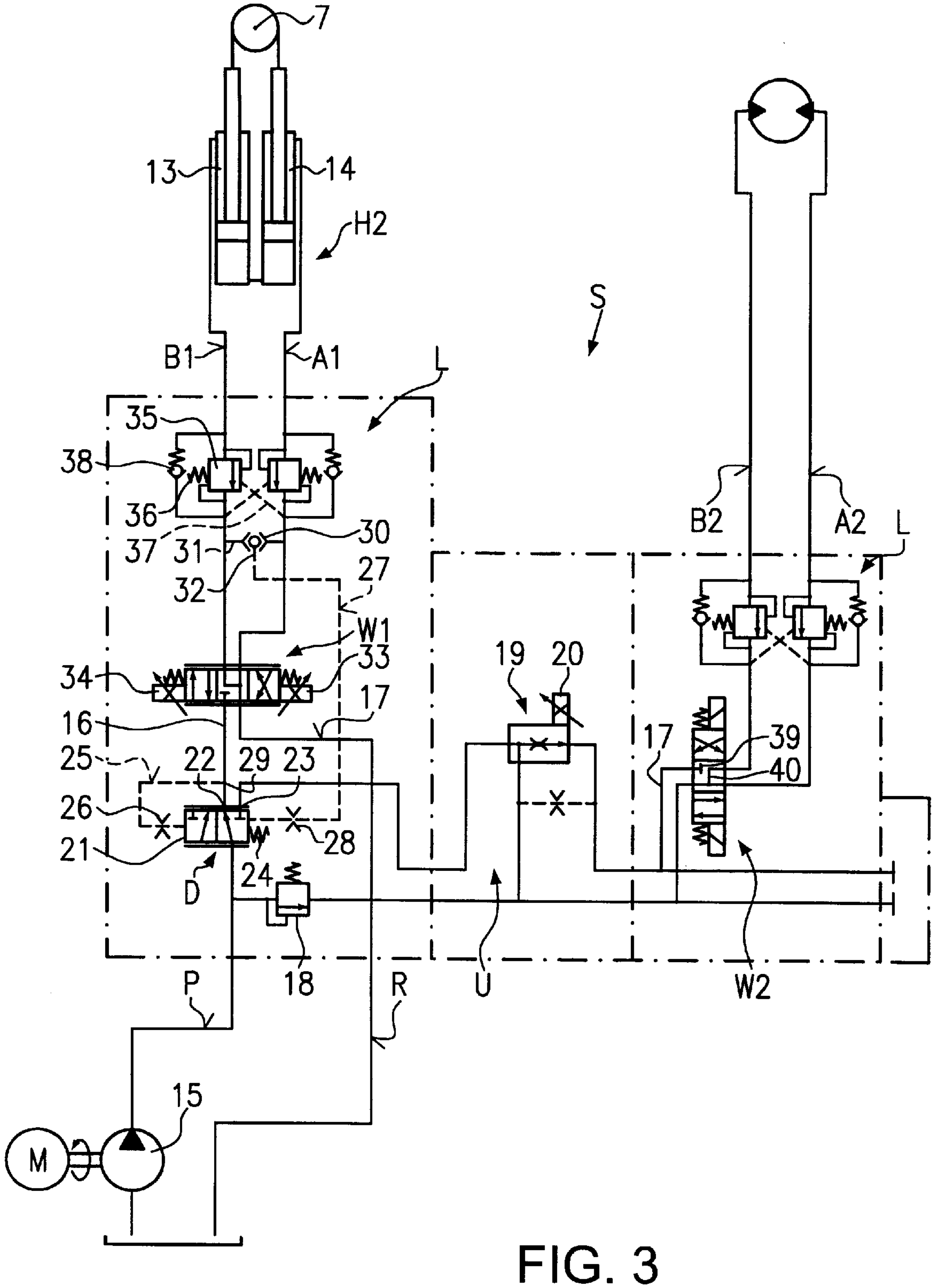
FIG. 3 is a block diagram of a first embodiment of a stacker control.

A shelf stacker (fork lift truck) as shown in FIGS. 1 and 2, in particular a stacker F for high storage racks 10, 11 comprises a travel body 1 with actuating elements 2 of an actuating system 3 for a fork G and optionally, for a steering system (not shown in more detail), a travel drive, a lifting/lowering function and, if necessary, a tilting function. The actuating device 3 is connected to a stacker control S and, optionally, to a computer C. The fork G is horizontally movable in guide means 4 in a direction transverse to the longitudinal direction of the stacker F (horizontal thrust function) and is, for instance, pivotably mounted on a mast 6 (fork turn function) defining a vertical axis 7 (swing-shift fork). The mast 6 is held in a support construction 5. The shift movement of the fork G is controlled with a hydraulic motor H1, whereas the swing movement of the fork G about the vertical axis 7 (turning range at least 180°) is controlled with at least one hydraulic motor H2. The computer C is linked or connectable to the stacker control S. Furthermore, there may be provided position or displacement detectors 8, 9 for the instantaneous position of the fork G, the signals of said detectors being supplied to the computer C.

FIG. 2 shows how the shelf stacker F operates within a laterally defined aisle area 12 between rows of shelves 10, 11, with the aisle width being only slightly wider than the width of fork G. With simultaneous swing and shift movements of the fork G, said fork is pivoted within the aisle width from the basic position shown in unbroken lines, in which the fork arms are oriented in the direction of travel, by about 90° to one or the other side until the fork arms are oriented towards the rows of shelves. Such a maneuver may e.g. be assisted by the computer C. The movements of the hydraulic motors H1, H2 are superimposed on one another in such fashion that the fork G does not collide with the rows of shelves 10, 11.

Figure 4:
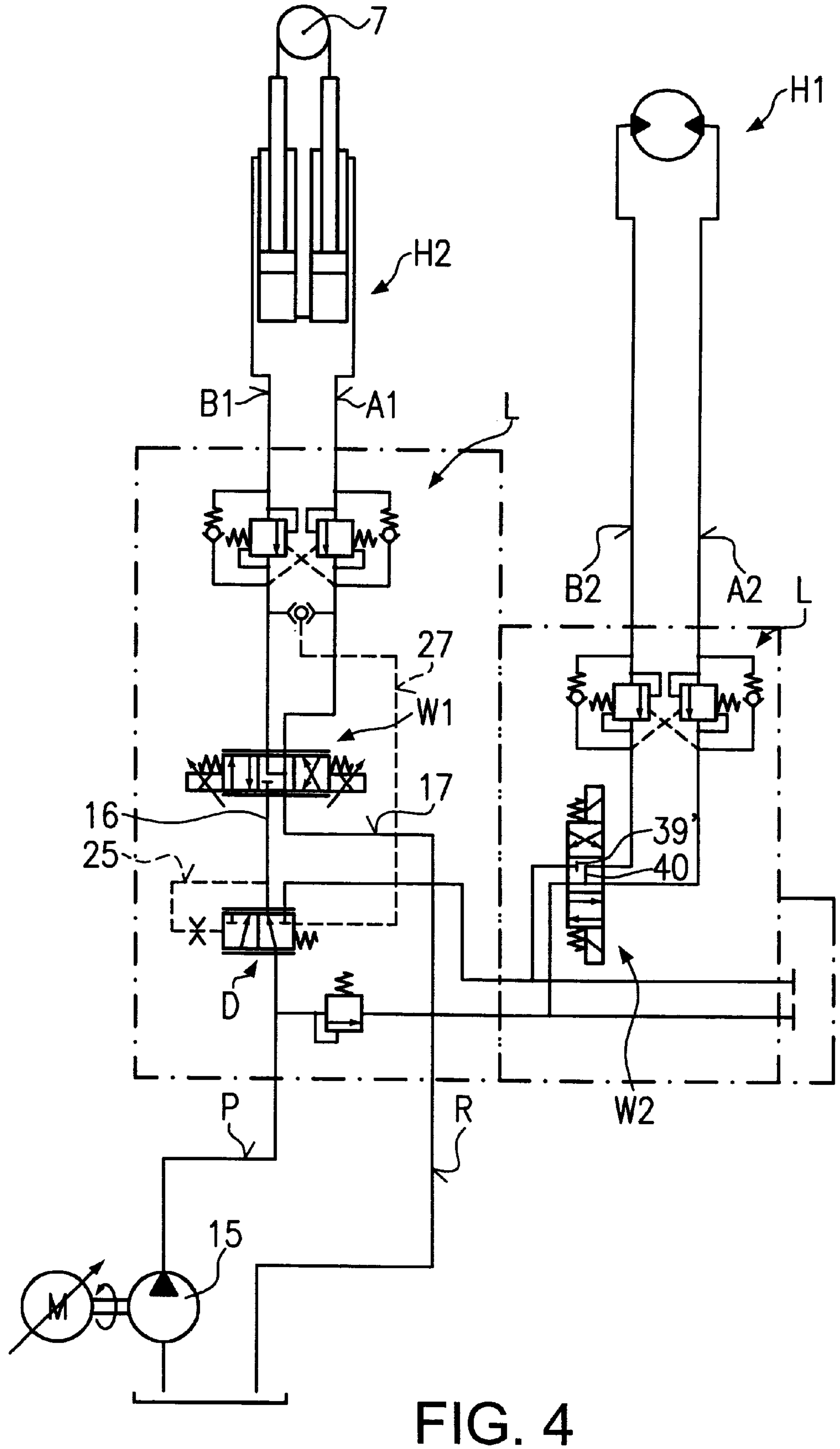
FIG. 4 is a block diagram of a further embodiment of a stacker control.

According to FIGS. 3 and 4, the hydraulic motor HI for the shift movement is a rotatable hydraulic motor (or a pair of hydraulic cylinders, not shown), whilst the hydraulic motor H2 for the swing movement of the fork G consists of two unilaterally actuable cylinders 13, 14 which pivot the fork G back and forth about the vertical axis 7. Both cylinders 13, 14 are e.g. only acted upon at their piston rod sides whilst their piston sides are short-circuited.

The stacker control S in FIG. 3 is supplied with pressurized fluid from a source of pressure 15, e.g. an electrically driven hydraulic pump. A pump line P which is connected to a return means R via a pressure relief valve 18 leads to the inlet port of a three-way pressure balance D. A pressure port 22 of the three-way pressure balance D is connected via a pressure line 16 to the pressure inlet of a proportional directional control valve W1 which in both displacement directions can be adjusted by means of proportional magnets 33, 34 from a zero position which is centered by springs (4/3 directional control valve with open zero position). Two work lines A1, B1 lead from the proportional directional control valve W1 to the two cylinders 13, 14 of the hydraulic motor H2. A load holding valve assembly L is arranged in the work lines A1, B2 with two load holding valves 35 which are each pilot-operated against a spring 36, and with check valves 38 bypassing said valves. Each load holding valve 35 which is arranged in a work line A1 or B1 can be pilot-operated via a control line 37 from the respectively other work line B1, A1 in response to pressure.

A transverse line 31 connects the two work lines A1 and B1 between the proportional directional control valve W1 and the load holding device L. A changing valve 30 is provided in the transverse line 31 with a port 32 passing the respectively higher pressure in a work line. A control line 27 extends from port 32 via a throttle 28 to a control side of the three-way pressure balance D. A control line 25 which extends via a throttle 26 to the opposite control side of the three-way pressure balance D is branched off between the three-way pressure balance D and the proportional directional control valve W1. The three-way pressure balance contains a control piston 21 which is acted upon by means of the control pressure prevailing in the control line 25 in the closing direction of a connection between the pump line P and the pressure line 16. By contrast, in the opposite direction, i.e. in the opening direction of said connection, the control piston 21 is acted upon by the control pressure prevailing in the control line 27 and by a control spring 24.

A further pressure line 17 which leads to at least one further hydraulic motor, i.e. the shift type hydraulic motor H1, is connected to a second pressure port 23 of the three-way pressure balance D. In FIG. 3, the pressure line 17 has arranged therein a three-way flow regulator 19 which is adjustable by means of a proportional magnet 20 and possesses a connection to the return means R. Downstream of the three-way flow regulator 19, the pressure line 17 is connected to a port 39 of a magnetically operated directional control valve W2 (4/3 directional control valve with open zero position). Two work lines A2, B2 lead from the directional control valve W2 to the hydraulic motor H1. A further load holding device L is provided between the directional control valve W2 and the hydraulic motor H1, in accordance with the load holding device L of the hydraulic motor H2. Open zero position means with respect to the directional control valve W1, W2 that, as outlined in W2, both work lines are connected via a transverse channel 40 to the return means R in a central position which is centered by springs, while the pressure port 39 is shut off. The directional control valve W2 could also be operated by proportional magnets and work in a precisely proportional manner.

In contrast to FIG. 3, the pressure line 17 in the stacker control S of FIG. 4 is directly guided to the directional control valve W2 (4/3 directional control valve with open zero position), in which in the central position the transverse channel 40 connects both work lines A2, B2 to the return means, and the pressure line 17 is also connected to the return means via its pressure port 39' and the transverse channel 40.

In both embodiments of the stacker control S of FIGS. 3 and 4, there is provided a neutral circulation circuit U via which the hydraulic means delivered by the source of pressure 15 is drained to the return means in case none of the hydraulic motors H1, H2 is moved and a respective load is held. Part of the neutral circulation circuit U is the three-way pressure balance D which in the closed position of the connection from the pump line P to the pressure line 16 leads the hydraulic medium into the pressure line P from which in FIG. 3 it passes via the three-way flow regulator 19 to the return means, whereas it passes via the transverse channel 40 in the stacker control shown in FIG. 4.

In the stacker control S in FIG. 4, a specific control of the shift-type hydraulic motor could e.g. be carried out by means of a speed-controllable hydraulic pump.

FIG. 5 shows a simple embodiment of the three-way pressure balance D of the preceding figures in longitudinal section. In a housing 41 comprising a housing hole 42 two pressure ports 16, 17 are provided with grooves 43, 44 which define control edges. In the housing hole 42, the control piston K, 21 is sealingly movable in response to the control pressures acting in both axial directions, from the control lines 25 and 27, respectively, with the force of the expediently adjustable control spring 24 being added to the control pressure of the control line 27. The control spring is made very weak and, substantially, is only sufficient for holding the control piston K in the open position of the connection from the pressure port P to the pressure port 16 when the system is without any pressure. The force of the control spring 24 is substantially the relevant throttling factor which in the case of switching to the pressureless neutral circulation must be overcome by the source of pressure.

In the control piston K, a flow channel is shaped in the form of a groove 45 which is defined at both sides by control edges 46 and 47. The control edges 46 and 47 alternately cooperate with the grooves 43, 44 or the control edges thereof in the manner of apertures to throttle the pressurized fluid accordingly and to pass it either to the pressure port 16 or to the pressure port 17, and to keep constant the pressure difference set in the directional control valve W1 by the electric current, through corresponding control movements. It is evident that the control pressure acting on the control piston at the lift side could also be tapped from the control port 16 via a throttle hole directly in the housing 41.

What is claimed is:

1. A stacker control of a shelf stacker comprising a swing-shift fork, in particular a stacker for high storage racks, said fork being turnable about at least one vertical axis by a first hydraulic motor and being horizontally movable by a second hydraulic motor with said motors controlled by magnetically operated directional control valves connected to a common electrically operated hydraulic pump, a three-way pressure balance valve provided between said pump and said directional control valves for preferring said first of said hydraulic motors, said three-way pressure balance valve being controlled by control pressures tapped upstream and downstream of said directional control valve of said preferred first hydraulic motor, at least said directional control valve of said preferred first hydraulic motor being designed with a zero position which is open towards a tank, said three-way pressure balance valve being a part of a neutral circulation circuit extending from said pump via said directional control valve of said second hydraulic motor to said tank, said directional control valve of said preferred first hydraulic motor connecting in its zero position to said tank and blocking a pressure line extending from said three-way pressure balance valve towards said directional control valve, wherein said directional control valve of said second hydraulic motor is a magnetically operated directional control valve and is connected to said three-way pressure balance valve via a pressure line containing a three-way flow regulator connected to said tank, said three-way flow regulator being adjustable by a proportional magnet.

2. Stacker control as in claim 1, wherein said preferred first hydraulic motor is a hydraulic swing motor for turning said fork.

3. Stacker control as in claim 1, wherein said directional control valve of said preferred first hydraulic motor is a proportional directional control valve.

4. Stacker control as in claim 1, wherein each of said hydraulic motors is connected by two work lines with its respective directional control valve, said work lines each comprising a load holding device, said load holding devices being alternatively pilot-operated from the opposite one of said two work lines, said two work lines being mutually interconnected by a transverse line containing a change over valve having an outlet providing the respectively higher work line pressure as said control pressure for said three-way pressure balance valve via a control line extending from said outlet to said three-way pressure balance valve.

5. Stacker control as in claim 1, wherein said three-way pressure balance valve contains a control piston for gradually opening and closing a flow connection provided between said pump and said directional control valve of said preferred first hydraulic motor, said control piston being acted upon by a higher control pressure tapped upstream of said directional control valve of said preferred first hydraulic motor and in the direction of closing said flow connection, and said control piston being acted upon by a lower control pressure in a direction of opening said flow connection, said lower control pressure being tapped downstream of said directional control valve of said preferred first hydraulic motor and in parallel by the force of a control spring.

6. Stacker control as in claim 5, wherein said control piston is axially adjustable in a housing bore into which two pressure ports extend in a lateral direction, said control piston comprising a flow path defined by two opposite control edges, said pressure ports and said control edges cooperating in the manner of apertures and in alternative fashion.

7. Stacker control as in claim 1, wherein said neutral circulation circuit extends via said three-way flow regulator operated by said proportional magnet to said tank.

8. Stacker control as in claim 1, wherein said directional control valve of said second hydraulic motor is designed with an open zero position connecting work lines of said second hydraulic motor to said tank and blocking off said pressure line extending from said three-way pressure balance valve towards said directional control valve.

* * * * *